(12) United States Patent
Choi et al.

(10) Patent No.: US 11,006,417 B2
(45) Date of Patent: May 11, 2021

(54) METHOD FOR TRANSMITTING AND RECEIVING MULTIPLEXED UPLINK CONTROL CHANNEL AND LOCALIZED SOUNDING REFERENCE SYMBOL AND DEVICE THEREFOR

(71) Applicant: LG Electronics Inc., Seoul (KR)

(72) Inventors: Kukheon Choi, Seoul (KR); Ilmu Byun, Seoul (KR); Kyuseok Kim, Seoul (KR); Minki Ahn, Seoul (KR); Kilbom Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 16/328,999

(22) PCT Filed: Aug. 25, 2017

(86) PCT No.: PCT/KR2017/009312
§ 371 (c)(1),
(2) Date: Feb. 27, 2019

(87) PCT Pub. No.: WO2018/043997
PCT Pub. Date: Mar. 8, 2018

(65) Prior Publication Data
US 2019/0200359 A1 Jun. 27, 2019

Related U.S. Application Data

(60) Provisional application No. 62/380,471, filed on Aug. 28, 2016.

(51) Int. Cl.
*H04W 72/04* (2009.01)
*H04L 25/02* (2006.01)
*H04L 5/00* (2006.01)

(52) U.S. Cl.
CPC ....... *H04W 72/0453* (2013.01); *H04L 5/0048* (2013.01); *H04L 5/0051* (2013.01);
(Continued)

(58) Field of Classification Search
None
See application file for complete search history.

(56) References Cited

U.S. PATENT DOCUMENTS

| 9,847,862 | B2 * | 12/2017 | Soriaga | H04L 5/0048 |
| 2010/0008333 | A1 * | 1/2010 | Kim | H04L 5/0053 370/336 |
| 2018/0241514 | A1 * | 8/2018 | Kim | H04W 72/1252 |

FOREIGN PATENT DOCUMENTS

| KR | 101480189 | 1/2015 |
| KR | 1001489101 | 2/2015 |

(Continued)

OTHER PUBLICATIONS

Huawei, HiSilicon, "Simultaneous transmission of SRS and PUCCH," R1-114086. 3GPP TSG RAN WG1 Meeting #67, San Francisco, USA, Nov. 14-18, 2011, 3 pages.

*Primary Examiner* — Anh Ngoc M Nguyen
(74) *Attorney, Agent, or Firm* — Fish & Richardson P.C.

(57) ABSTRACT

A method for transmitting a multiplexed uplink control channel and localized sounding reference symbol (localized SRS) by a terminal comprises a step of dividing the uplink control channel into a plurality of uplink control channel sub-blocks in a frequency domain and then transmitting the divided uplink control channel, when a frequency bandwidth of the localized SRS is smaller than or equal to a coherent bandwidth, wherein the divided uplink control channel sub-blocks may be frequency-division-multiplexed together with at least one localized SRS and then transmitted in one symbol.

17 Claims, 10 Drawing Sheets

(52) U.S. Cl.
CPC ............ *H04L 5/0053* (2013.01); *H04L 25/02* (2013.01); *H04L 25/0224* (2013.01); *H04W 72/0413* (2013.01)

(56) References Cited

FOREIGN PATENT DOCUMENTS

| KR | 101569258 | 11/2015 |
|---|---|---|
| WO | WO2011134532 | 11/2011 |

* cited by examiner

FIG. 6

| XPDCCH | Region where UL channel can be estimated using UL data channel DMRS and xSRS | xSRS |
| | Region where UL channel is estimated using DMRS in UL data channel | xPDCCH |
| | Region where UL channel can be estimated using UL data channel DMRS and xSRS | xSRS |

METHOD FOR TRANSMITTING AND RECEIVING MULTIPLEXED UPLINK CONTROL CHANNEL AND LOCALIZED SOUNDING REFERENCE SYMBOL AND DEVICE THEREFOR

CROSS-REFERENCE TO RELATED APPLICATIONS

This application is a National Stage application under 35 U.S.C. § 371 of International Application No. PCT/KR2017/009312, filed on Aug. 25, 2017, which claims the benefit of U.S. Provisional Application Ser. No. 62/380,471, filed on Aug. 28, 2016. The disclosures of the prior applications are incorporated by reference in their entirety.

TECHNICAL FIELD

The present disclosure relates to wireless communication, and more particularly to, method of transmitting and receiving an uplink control channel and localized sounding reference symbol which are multiplexed and devices therefor.

BACKGROUND ART

With the introduction of a new Radio Access Technology (RAT) system, a number of communication devices have required higher communication capacity, and thus the necessity of mobile broadband communication much improved than the conventional RAT has increased. In addition, massive Machine Type Communications (MTC) capable of providing various services at anytime and anywhere by connecting a number of devices or things to each other has been considered as an important issue to be discussed in the next generation communication system. Moreover, a communication system design capable of supporting services/UEs sensitive to reliability and latency has been discussed. That is, the new RAT system is expected to provide services by considering enhanced Mobile Broadband Communication (eMBB), massive MTC (mMTC), Ultra-reliable and low-latency communication (URLLC), and the like.

DISCLOSURE OF THE INVENTION

Technical Task

A first object of the present disclosure is to provide to a method of transmitting, by a user equipment, an uplink control channel and a localized Sounding Reference Symbol (SRS) which are multiplexed.

A second object of the present disclosure is to provide a method of receiving, by a base station, an uplink control channel and a localized SRS which are multiplexed.

A third object of the present disclosure is to provide a user equipment for transmitting an uplink control channel and a localized SRS which are multiplexed.

A fourth object of the present disclosure is to provide a base station for receiving an uplink control channel and a localized SRS which are multiplexed.

It will be appreciated by persons skilled in the art that the objects that could be achieved with the present invention are not limited to what has been particularly described hereinabove and the above and other objects that the present invention could achieve will be more clearly understood from the following detailed description.

Technical Solution

To achieve the first object of the present disclosure, provided is a method of transmitting, by a user equipment, an uplink control channel and a localized SRS which are multiplexed. The method may include, if a frequency band length of the localized SRS is equal to or smaller than a length of a coherent bandwidth, transmitting the uplink control channel by segmenting the uplink control channel into a plurality of uplink control channel sub-blocks in a frequency domain. In this case, the segmented uplink control channel sub-blocks may be transmitted in one symbol being frequency division multiplexed with at least one localized SRS.

The segmented uplink control channel sub-blocks and the localized SRS may be transmitted on a same antenna port. The at least one localized SRS may be transmitted at a corresponding resource location between the segmented uplink control channel sub-blocks. Only when the uplink control channel is used for a predetermined specific service, the uplink control channel may be transmitted being segmented into the plurality of uplink control channel sub-blocks.

To achieve the second object of the present disclosure, provided is a method of receiving, by a base station, an uplink control channel and a localized SRS which are multiplexed. The method may include, if a frequency band length of the localized SRS is equal to or smaller than a length of a coherent bandwidth, receiving the uplink control channel that is segmented into a plurality of uplink control channel sub-blocks in a frequency domain. In this case, the segmented uplink control channel sub-blocks may be received in one symbol being frequency division multiplexed with at least one localized SRS.

The at least one localized SRS may be received at a corresponding resource location between the segmented uplink control channel sub-blocks. The method may further include estimating an uplink channel using the at least one localized SRS. The uplink control channel may be received such that a remaining region except a resource region corresponding to a reference signal included in the uplink control channel is segmented into the plurality of uplink control channel sub-blocks.

To achieve the third object of the present disclosure, provided is a user equipment for transmitting an uplink control channel and a localized SRS which are multiplexed. The user equipment may include: a transmitter; and a processor. The processor may be configured to control the transmitter to: if a frequency band length of the localized SRS is equal to or smaller than a length of a coherent bandwidth, transmit the uplink control channel by segmenting the uplink control channel into a plurality of uplink control channel sub-blocks in a frequency domain; and transmit the segmented uplink control channel sub-blocks in one symbol by frequency division multiplexing with at least one localized SRS.

The processor may be configured to control the transmitter to transmit the segmented uplink control channel sub-blocks and the localized SRS on a same antenna port. In addition, the processor may be configured to control the transmitter to transmit the at least one localized SRS at a corresponding resource location between the segmented uplink control channel sub-blocks. Moreover, the processor may be configured to control the transmitter to transmit the plurality of segmented uplink control channel sub-blocks in a remaining region of the uplink control channel except a resource region corresponding to a reference signal included in the uplink control channel.

To achieve the fourth object of the present disclosure, provided is a base station for receiving an uplink control channel and a localized SRS which are multiplexed. The base station may include: a receiver; and a processor. The processor may be configured to control the receiver to: if a frequency band length of the localized SRS is equal to or smaller than a length of a coherent bandwidth, receive the uplink control channel that is segmented into a plurality of uplink control channel sub-blocks in a frequency domain; and receive the segmented uplink control channel sub-blocks and at least one localized SRS in one symbol using a frequency division multiplexing scheme. In addition, the processor may be configured to estimate an uplink channel using the at least one localized SRS.

Advantageous Effects

According to an embodiment of the present disclosure, when sub-band SRS resources are triggered and when an uplink control channel and a sub-band SRS are multiplexed, it is possible to use the subband SRS as a DMRS of the uplink control channel based on various multiplexing structures between the subband SRS and uplink control channel.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the present disclosure and are incorporated in and constitute a part of this specification, illustrate embodiments of the invention and together with the description serve to explain the principles of the disclosure.

FIG. 6 is a diagram illustrating utilization of UL channel estimation in a self-contained subframe structure when SRS+xPUCCH symbols are triggered.

BEST MODE FOR INVENTION

Reference will now be made in detail to the preferred embodiments of the present disclosure, examples of which are illustrated in the accompanying drawings. In the following detailed description of the disclosure includes details to help the full understanding of the present disclosure. Yet, it is apparent to those skilled in the art that the present disclosure can be implemented without these details. For instance, although the following descriptions are made in detail on the assumption that a mobile communication system includes the 3GPP LTE and LTE-A systems, the following descriptions are applicable to other random mobile communication systems by excluding unique features of the 3GPP LTE and LTE-A systems.

Occasionally, to prevent the present disclosure from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user stage device as a user equipment (UE), a mobile station (MS), an advanced mobile station (AMS) and the like. In addition, assume that a base station (BS) is a common name of such a random node of a network stage communicating with a terminal as a Node B (NB), an eNode B (eNB), an access point (AP) and the like.

In a mobile communication system, a UE can receive information from a BS in downlink and transmit information in uplink. The UE can transmit or receive various data and control information and use various physical channels depending types and uses of its transmitted or received information.

Moreover, in the following description, specific terminologies are provided to help the understanding of the present disclosure. In addition, the use of the specific terminology can be modified into another form within the scope of the technical idea of the present disclosure.

Figure 1:
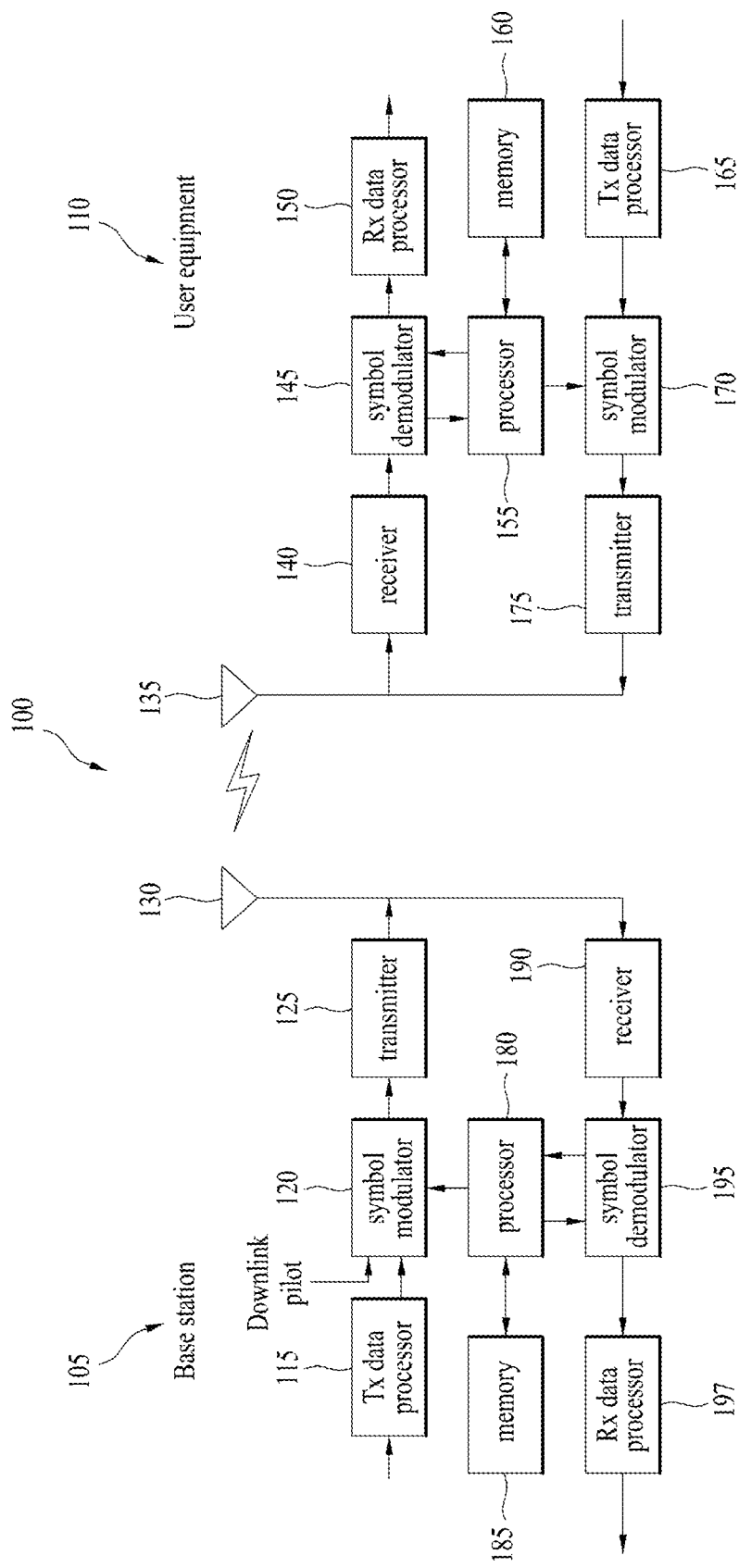
FIG. 1 is a block diagram illustrating configurations of a base station 105 and a user equipment 110 in a wireless communication system 100.

FIG. 1 is a block diagram illustrating configurations of a BS 105 and a UE 110 in a wireless communication system 100.

Although one BS 105 and one UE 110 are shown in the drawing to schematically represent the wireless communication system 100, the wireless communication system 100 may include at least one BSn and/or at least one UE.

Referring to FIG. 1, the BS 105 may include a Transmission (Tx) data processor 115, a symbol modulator 120, a transmitter 125, a transmitting and receiving antenna 130, a processor 180, a memory 185, a receiver 190, a symbol demodulator 195, and a Reception (Rx) data processor 197. The UE 110 may include a Transmission (Tx) data processor 165, a symbol modulator 170, a transmitter 175, a transmitting and receiving antenna 135, a processor 155, a memory 160, a receiver 140, a symbol demodulator 155, and a Reception (Rx) data processor 150. Although FIG. 1 shows that the BS 105 uses one transmitting and receiving antenna 130 and the UE 110 uses one transmitting and receiving antenna 135, each of the BS 105 and the UE 110 may include a plurality of antennas. Therefore, each of the BS 105 and the UE 110 according to the present disclosure can support the Multi-Input Multi-Output (MIMO) system. In addition, the BS 105 according to the present disclosure can also support both of the Single User-MIMO (SU-MIMO) system and the Multi-User-MIMO (MU-MIMO) system.

For downlink transmission, the Tx data processor 115 receives traffic data, formats the received traffic data, codes the formatted traffic data, interleaves and modulates (or perform symbol mapping on) the coded traffic data, and provides modulated symbols (data symbols). The symbol modulator 120 provides a stream of symbols by receiving and processing the data symbols and pilot symbols.

The symbol modulator 120 performs multiplexing of the data and pilot symbols and transmits the multiplexed symbols to the transmitter 125. In this case, each of the transmitted symbols may be a data symbol, a pilot symbol or a zero value signal. In each symbol period, pilot symbols may be continuously transmitted. In this case, each of the pilot symbols may be a Frequency Division Multiplexing (FDM) symbol, an Orthogonal Frequency Division Multiplexing (OFDM) symbol, or a Code Division Multiplexing (CDM) symbol.

The transmitter 125 receives the symbol stream, converts the received symbol stream into one or more analog signals, adjusts the analog signals (e.g., amplification, filtering, frequency upconverting, etc.), and generates a downlink signal suitable for transmission on a radio channel. Thereafter, the transmitting antenna 130 transmits the downlink signal to the UE.

Hereinafter, the configuration of the UE 110 is described. The receiving antenna 135 receives the downlink signal from the BS and forwards the received signal to the receiver 140. The receiver 140 adjusts the received signal (e.g., filtering, amplification, frequency downconverting, etc.) and obtains samples by digitizing the adjusted signal. The symbol demodulator 145 demodulates the received pilot symbols and forwards the demodulated pilot symbols to the processor 155 for channel estimation.

The symbol demodulator 145 receives a frequency response estimation value for downlink from the processor 155, performs data demodulation on the received data symbols, obtains data symbol estimation values (i.e., estimation values of transmitted data symbols), and provides the data symbols estimation values to the Rx data processor 150. The Rx data processor 150 reconstructs the transmitted traffic data by demodulating (i.e., performing symbol demapping on), deinterleaving and decoding the data symbol estimated values.

The processing performed by the symbol demodulator 145 and the Rx data processor 150 are complementary to that performed by the symbol modulator 120 and the transmission data processor 115 of the BS 105, respectively.

For uplink transmission, the Tx data processor 165 of the UE 110 processes the traffic data and provides data symbols. The symbol modulator 170 receives the data symbols, performs multiplexing of the received data symbols, modulates the multiplexed symbols, and provides a stream of symbols to the transmitter 175. The transmitter 175 receives the symbol stream, processes the received stream, and generates an uplink signal. The transmitting antenna 135 transmits the generated uplink signal to the BS 105.

The BS 105 receives the uplink signal from the UE 110 through the receiving antenna 130. The receiver 190 obtains samples by processing the received uplink signal. Subsequently, the symbol demodulator 195 processes the samples and provides pilot symbols received in uplink and data symbol estimation values. The Rx data processor 197 reconstructs the traffic data transmitted from the UE 110 by processing the data symbol estimation values.

The processor 155 of the UE 110 controls operations (e.g., control, adjustment, management, etc.) of the UE 110, and the processor 180 of the BS 105 controls operations (e.g., control, adjustment, management, etc.) of the BS 105. The processors 155 and 180 may be connected to the memory units 160 and 185 configured to store program codes and data, respectively. Specifically, the memory units 160 and 185, which are connected to the processors 155 and 180, respectively, store operating systems, applications, and general files.

Each of the processors 155 and 180 can be called a controller, a microcontroller, a microprocessor, a microcomputer or the like. In addition, the processors 155 and 180 can be implemented using hardware, firmware, software and/or any combinations thereof. When the embodiments of the present disclosure are implemented using hardware, the processors 155 and 180 may be provided with Application Specific Integrated Circuits (ASICs), Digital Signal Processors (DSPs), Digital Signal Processing Devices (DSPDs), Programmable Logic Devices (PLDs), Field Programmable Gate Arrays (FPGAs), etc.

Meanwhile, when the embodiments of the present disclosure are implemented using firmware or software, the firmware or software may be configured to include modules, procedures, and/or functions for performing the above-explained functions or operations of the present disclosure. In addition, the firmware or software configured to implement the present disclosure is provided within the processors 155 and 180. Alternatively, the firmware or software may be saved in the memories 160 and 185 and then driven by the processors 155 and 180.

Radio protocol layers between a UE and a BS in a wireless communication system (network) may be classified as Layer 1 (L1), Layer 2 (L2), and Layer 3 (L3) based on three lower layers of the Open System Interconnection (OSI) model well known in communication systems. A physical layer belongs to the L1 layer and provides an information transfer service via a physical channel. A Radio Resource Control (RRC) layer belongs to the L3 layer and provides control radio resources between a UE and a network. That is, a BS and a UE may exchange RRC messages through RRC layers in a wireless communication network.

In the present specification, since it is apparent that the UE processor 155 and the BS processor 180 are in charge of processing data and signals except transmission, reception, and storage functions, they are not mentioned specifically for convenience of description. In other words, even if the the processors 155 and 180 are not mentioned, a series of data processing operations except the transmission, reception, and storage functions can be assumed to be performed by the the processors 155 and 180.

For Tx beam tracking, a UE needs to transmit an SRS for each candidate UE Tx beam. However, since SRS transmission in many beam directions (in accordance with a UE's Tx beam set for all directions) results in significant resource waste, the present disclosure proposes a method of achieving adaptive UE Tx beam tracking by flexibly transmitting an SRS based on a UE pattern change.

First, Table 1 below shows details of SRS transmission in the 3GPP LTE/LTE-A system.

TABLE 1

A UE shall transmit Sounding Reference Symbol (SRS) on per serving cell SRS resources based on two trigger types: trigger type 0: higher layer signalling-trigger type 1: DCI formats 0/4/1A for FDD and TDD and DCI formats 2B/2C/2D for TDD. In case both trigger type 0 and trigger type 1 SRS transmissions would occur in the same subframe in the same serving cell, the UE shall only transmit the trigger type 1

TABLE 1-continued

SRS transmission. A UE may be configured with SRS parameters for trigger type 0 and trigger type 1 on each serving cell. The following SRS parameters are serving cell specific and semi-statically configurable by higher layers for trigger type 0 and for trigger type 1. -Transmission comb $\bar{k}_{TC}$, as defined in subclause 5.5.3.2 of [3] for trigger type 0 and each configuration of trigger type 1-Starting physical resource block assignment $n_{RRC}$, as defined in subclause 5.5.3.2 of [3] for trigger type 0 and each configuration of trigger type 1-duration: single or indefinite (until disabled), as defined in [11] for trigger type 0-srs-ConfigIndex $I_{SRS}$ for SRS periodicity $T_{SRS}$ and SRS subframe offset $T_{offset}$, as defined in Table 8.2-1 and Table 8.2-2 for trigger type 0 and SRS periodicity $T_{SRS,1}$, and SRS subframe offset $T_{SRS,1}$, as defined in Table 8.2-4 and Table 8.2-5 trigger type 1-SRS bandwidth $B_{SRS}$, as defined in subclause 5.5.3.2 of [3] for trigger type 0 and each configuration of trigger type 1-Frequency hopping bandwidth, $b_{hop}$, as defined in subclause 5.5.3.2 of [3] for trigger type 0-Cyclic shift $n_{SRS}^{CS}$, as defined in subclause 5.5.3.1 of [3] for trigger type 0 and each configuration of trigger type 1-Number of antenna ports $N_p$, for trigger type 0 and each configuration of trigger type 1 For trigger type 1 and DCI format 4 three sets of SRS parameters, srs-ConfigApDCI-Format4, are configured by higher layer signalling. The 2-bit SRS request field in [4] in DCI format 4 indicated the SRS parameter set given in Table 8.1-1. For trigger type 1 and DCI format 0, a single set of SRS parameters, srs-ConfigApDCI-Format0, is configured by higher layer signalling. For trigger type 1 and DCI formats 1A/2B/2C/2D, a single common set of SRS parameters, srs-ConfigApDCI-Format 1a2b2c, is configured by higher layer signalling. The SRS request field is 1 bit [4] for DCI formats 0/1A/2B/2C/2D, with a type 1 SRS triggered if the value of the SRS request field is set to '1'. A 1-bit SRS request field shall be included in DCI formats 0/1A for frame structure type 1 and 0/1A/2B/2C/2D for frame structure type 2 if the UE is configured with SRS parameters for DCI formats 0/1A/2B/2C/2D by higher-layer signalling.

Table 2 below shows SRS request values for trigger type 1 of DCI format 4 in the 3GPP LTE/LTE-A system.

TABLE 2

| Value of SRS request field | Description |
| --- | --- |
| '00' | No type 1 SRS trigger |
| '01' | The 1$^{st}$ SRS parameter set configured by higher layers |
| '10' | The 2$^{nd}$ SRS parameter set configured by higher layers |
| '11' | The 3$^{rd}$ SRS parameter set configured by higher layers |

Table 3 below shows additional details of the SRS transmission in the 3GPP LTE/LTE-A system.

TABLE 3

The serving cell specific SRS transmission bandwidths $C_{SRS}$ are configured by higher layers. The allowable values are given in subclause 5.5.3.2 of [3]. The serving cell specific SRS transmission sub-frames are configured by higher layers. The allowable values are given in subclause 5.5.3.3 of [3]. For a TDD serving cell, SRS transmissions can occur in UpPTS and uplink subframes of the UL/DL configuration indicated by the higher layer parameter subframeAssignment for the serving cell. When closed-loop UE transmit antenna selection is enabled for a given serving cell for a UE that supports transmit antenna selection, the index $a(n_{SRS})$, of the UE antenna that transmits the SRS at time $n_{SRS}$ is given by $a(n_{SRS}) = n_{SRS} \bmod 2$, for both partial and full sounding bandwidth, and when frequency hopping is disabled (i.e., $b_{hop} \geq B_{SRS}$), $$a(n_{SRS}) = \begin{cases} (n_{SRS} + \lfloor n_{SRS}/2 \rfloor + \beta \cdot \lfloor n_{SRS}/K \rfloor) \bmod 2 & \text{when } K \text{ is even} \\ n_{SRS} \bmod 2 & \text{when } K \text{ is odd} \end{cases},$$

$$\beta = \begin{cases} 1 & \text{where } K \bmod 4 = 0 \\ 0 & \text{otherwise} \end{cases} \text{ when frequency hopping is enabled (i.e.}$$

$b_{hop} < B_{SRS}$), where values $B_{SRS}$, $b_{hop}$, $N_b$, and $n_{SRS}$ are given in subclause 5.5.3.2 of [3], and $K = \prod_{b'=b_{hop}}^{B_{SRS}} N_b$ (where $N_{b_{hop}} = 1$ regardless of the TABLE 3-continued $N_b$ value), except when a single SRS transmission is configured for the UE. If a UE is configured with more than one serving cell, the UE is not expected to transmit SRS on different antenna ports simultaneously. A UE may be configured to transmit SRS on Np antenna ports of a serving cell where Np may be configured by higher layer signalling. For PUSCH transmission mode 1 $N_p \in \{0, 1, 2, 4\}$ and for PUSCH transmission mode 2 $N_p \in \{0, 1, 2\}$ with two antenna ports configured for PUSCH and $N_p \in \{0, 1, 4\}$ with 4 antenna ports configured for PUSCH. A UE configured for SRS transmission on multiple antenna ports of a serving cell shall transmit SRS for all the configured transmit antenna ports within one SC-FDMA symbol of the same subframe of the serving cell. The SRS transmission bandwidth and starting physical resource block assignment are the same for all the configured antenna ports of a given serving cell. A UE not configured with multiple TAGs shall not transmit SRS in a symbol whenever SRS and PUSCH transmissions happen to overlap in the same symbol. For TDD serving cell, when one SC-FDMA symbol exists in UpPTS of the given serving cell, it can be used for SRS transmission. When two SC-FDMA symbols exist in UpPTS of the given serving cell, both can be used for SRS transmission and for trigger type 0 SRS both can be assigned to the same UE. If a UE is not configured with multiple TAGs, or if a UE is configured with multiple TAGs and SRS and PUCCH format 2/2a/2b happen to coincide in the same subframe in the same serving cell, -The UE shall not transmit type 0 triggered SRS whenever type 0 triggered SRS and PUCCH format 2/2a/2b transmissions happen to coincide in the same subframe; -The UE shall not transmit type 1 triggered SRS whenever type 1 triggered SRS and PUCCH format 2a/2b or format 2 with HARQ-ACK transmissions happen to coincide in the same subframe; -The UE shall not transmit PUCCH format 2 without HARQ-ACK whenever type 1 triggered SRS and PUCCH format 2 without HARQ-ACK transmissions happen to coincide in the same subframe. If a UE is not configured with multiple TAGs, or if a UE is configured with multiple TAGs and SRS and PUCCH happen to coincide in the same subframe in the same serving cell, -The UE shall not transmit SRS whenever SRS transmission and PUCCH transmission carrying HARQ-ACK and/or positive SR happen to coincide in the same subframe if the parameter ackNackSRS-SimultaneousTransmission is FALSE; -For FDD-TDD and primary cell frame structure 1, the UE shall not transmit SRS in a symbol whenever SRS transmission and PUCCH transmission carrying HARQ-ACK and/or positive SR using shortened format as defined in subclauses 5.4.1 and 5.4.2A of [3] happen to overlap in the same symbol if the parameter ackNackSRS-SimultaneousTransmission is TRUE. -Unless otherwise prohibited, the UE shall transmit SRS whenever SRS transmission and PUCCH transmission carrying HARQ-ACK and/or positive SR using shortened format as defined in subclauses 5.4.1 and 5.4.2A of [3] happen to coincide in the same subframe if the parameter ackNackSRS-SimultaneousTransmission is TRUE. A UE not configured with multiple TAGs shall not transmit SRS whenever SRS transmission on any serving cells and PUCCH transmission carrying HARQ-ACK and/or positive SR using normal PUCCH format as defined in subclauses 5.4.1 and 5.4.2A of [3] happen to coincide in the same subframe. In UpPTS, whenever SRS transmission instance overlaps with the PRACH region for preamble format 4 or exceeds the range of uplink system bandwidth configured in the serving cell, the UE shall not transmit SRS. The parameter ackNackSRS-SimultaneousTransmission provided by higher layers determines if a UE is configured to support the transmission of HARQ-ACK on PUCCH and SRS in one subframe. If it is configured to support the transmission of HARQ-ACK on PUCCH and SRS in one subframe, then in the cell specific SRS subframes of the primary cell UE shall transmit HARQ-ACK and SR using the shortened PUCCH format as defined in subclauses 5.4.1 and 5.4.2A of [3], where the HARQ-ACK or the SR symbol corresponding to the SRS location is punctured. This shortened PUCCH format shall be used in a cell specific SRS subframe of the primary cell even if the UE does not transmit SRS in that subframe. The cell specific SRS subframes are defined in subclause 5.5.3.3 of [3]. Otherwise, the UE shall use the normal PUCCH format 1/1a/1b as defined in subclause 5.4.1 of [3] or normal PUCCH format 3 as defined in subclause 5.4.2A of [3] for the transmission of HARQ-ACK and SR. Trigger type 0 SRS configuration of a UE in a serving cell for SRS periodicity, $T_{SRS}$, and SRS subframe offset, $T_{offset}$, is defined in Table 8.2-1 and Table 8.2-2, for FDD and TDD serving cell, respectively. The periodicity $T_{SRS}$ of the SRS transmission is serving cell specific and is selected from the set {2, 5, 10, 20, 40, 80, 160, 320} ms or subframes. For the SRS periodicity $T_{SRS}$ of 2 ms in TDD serving cell, two SRS resources are configured in a half frame containing UL subframe(s) of the given serving cell. Type 0 triggered SRS transmission instances in a given serving cell for TDD serving cell with $T_{SRS} > 2$ and for FDD serving cell are the subframes satisfying $(10 \cdot n_f + k_{SRS} - T_{offset}) \bmod T_{SRS} = 0$,, where for FDD $k_{SRS} = \{0, 1, , , , 0\}$ is the subframe index within the frame, for TDD serving cell $k_{SRS}$ is defined in Table 8.2-3. The SRS transmission instances for TDD serving cell with $T_{SRS} = 2$ are the subframes satisfying $k_{SRS} - T_{offset}$. For TDD serving cell, and a UE configured for type 0 triggered SRS transmission in serving cell c, and the UE configured with the parameter EIMTA-MainConfigServCell-r12 for serving cell c, if the UE does not detect an UL/DL configuration indication for radio frame m (as described in section 13.1), the UE shall not transmit trigger type 0 SRS
in a subframe of radio frame m that is indicated by the parameter eimta-HarqReferenceConfig-r12 as a downlink subframe unless the UE transmits PUSCH in the same subframe. Trigger type 1 SRS configuration of a UE in a serving cell for SRS periodicity, $T_{SRS,1}$, and SRS subframe offset, $T_{offset,1}$, is defined in Table 8.2-4 and Table 8.2-5, for FDD and TDD serving cell, respectively. The periodicity $T_{SRS,1}$ of the SRS transmission is serving cell specific and is selected from the set {2, 5, 10} ms or subframes. For the SRS periodicity $T_{SRS,1}$ of 2 ms in TDD serving cell, two SRS resources are configured in a half frame containing UL subframe(s) of the given serving cell. A UE configured for type 1 triggered SRS transmission in serving cell c and not configured with a carrier indicator field shall transmit SRS on serving cell c upon detection of a positive SRS request in PDCCH/EPDCCH scheduling PUSCH/PDSCH on serving cell c. A UE configured for type 1 triggered SRS transmission in serving cell c and configured with a carrier indicator field shall transmit SRS on serving cell c upon detection of a positive SRS request in PDCCH/EPDCCH scheduling PUSCH/PDSCH with the value of carrier indicator field corresponding to serving cell c. A UE configured for type 1 triggered SRS transmission on serving cell c upon detection of a
positive SRS request in subframe n of serving cell c shall commence SRS transmission in the first subframe satisfying $n + k$, $k \geq 4$ and $(10 \cdot n_f + k_{SRS} - T_{offset,1}) \bmod T_{SRS} = 0$ for TDD serving cell c with $T_{SRS,1} > 2$ and for FDD serving cell c, $(k_{SRS} - T_{offset,1}) \bmod 5 = 0$ for TDD serving cell c with $T_{SRS,1} = 2$ where for FDD serving cell c $k_{SRS} = \{0, 1, \ldots, 9\}$ is the subframe index within the frame $n_f$ for TDD serving cell c $k_{SRS}$ is defined in Table 8.2-3. A UE configured for type 1 triggered SRS transmission is not expected to receive type 1 SRS triggering events associated with different values of trigger type 1 SRS transmission parameters, as configured by higher layer signalling, for the same subframe and the same serving cell. For TDD serving cell c, and a UE configured with EIMTA-MainConfigServCell-r12 for a serving cell c, the UE shall not transmit SRS in a subframe of a radio frame that is indicated by the corresponding eIMTA-UL/DL-configuration as a downlink subframe. A UE shall not transmit SRS whenever SRS and a PUSCH transmission corresponding to a Random Access Response Grant or a retransmission of the same transport block as part of the contention based random access procedure coincide in the same subframe.

Table 4 shows subframe offset ($T_{offset}$) and UE-specific SRS periodicity ($T_{SRS}$) configurations for trigger type 0 in FDD.

TABLE 4

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

Table 5 shows subframe offset ($T_{offset}$) and UE-specific SRS periodicity ($T_{SRS}$) configurations for trigger type 0 in TDD.

TABLE 5

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-36 | 20 | $I_{SRS}$-17 |
| 37-76 | 40 | $I_{SRS}$-37 |
| 77-156 | 80 | $I_{SRS}$-77 |
| 157-316 | 160 | $I_{SRS}$-157 |
| 317-636 | 320 | $I_{SRS}$-317 |
| 637-1023 | reserved | reserved |

TABLE 6

| SRS Configuration Index $I_{SRS}$ | SRS Periodicity (ms) | SRS Subframe Offset |
|---|---|---|
| 0 | 2 | 0, 1 |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-44 | 20 | $I_{SRS}$-25 |
| 45-84 | 40 | $I_{SRS}$-45 |
| 85-164 | 80 | $I_{SRS}$-85 |
| 165-324 | 160 | $I_{SRS}$-165 |
| 325-644 | 320 | $I_{SRS}$-325 |
| 645-1023 | reserved | reserved |

Table 7 shows $k_{SRS}$ for the TDD.

TABLE 7

| | subframe index n | | | | | | | | | |
|---|---|---|---|---|---|---|---|---|---|---|
| | | 1 | | | | | 6 | | | | |
| | 0 | 1st symbol of UpPTS | 2nd symbol of UpPTS | 2 | 3 | 4 | 5 | 1st symbol of UpPTS | 2nd symbol of UpPTS | 7 | 8 | 9 |
| $k_{SRS}$ in case UpPTS length of 2 symbols | 0 | 1 | | 2 | 3 | 4 | | 5 | 6 | 7 | 8 | 9 |
| $k_{SRS}$ in case UpPTS length of 1 symbol | 1 | | | 2 | 3 | 4 | | 6 | | 7 | 8 | 9 |

Table 8 below shows subframe offset ($T_{offset,1}$) and UE-specific SRS periodicity ($T_{SRS,1}$) configurations for trigger type 1 in the FDD.

TABLE 8

| SRS Configuration Index $I_{SRS}$ | SRS Periodicity (ms) | SRS Subframe Offset |
|---|---|---|
| 0-1 | 2 | $I_{SRS}$ |
| 2-6 | 5 | $I_{SRS}$-2 |
| 7-16 | 10 | $I_{SRS}$-7 |
| 17-31 | reserved | reserved |

Table 9 below shows subframe offset ($T_{offset,1}$) and UE-specific SRS periodicity ($T_{SRS,1}$) configurations for trigger type 1 in the TDD.

TABLE 9

| SRS Configuration Index $I_{SRS}$ | SRS Periodicity (ms) | SRS Subframe Offset |
|---|---|---|
| 0 | reserved | reserved |
| 1 | 2 | 0, 2 |
| 2 | 2 | 1, 2 |
| 3 | 2 | 0, 3 |
| 4 | 2 | 1, 3 |
| 5 | 2 | 0, 4 |
| 6 | 2 | 1, 4 |
| 7 | 2 | 2, 3 |
| 8 | 2 | 2, 4 |
| 9 | 2 | 3, 4 |
| 10-14 | 5 | $I_{SRS}$-10 |
| 15-24 | 10 | $I_{SRS}$-15 |
| 25-31 | reserved | reserved |

Figure 2:
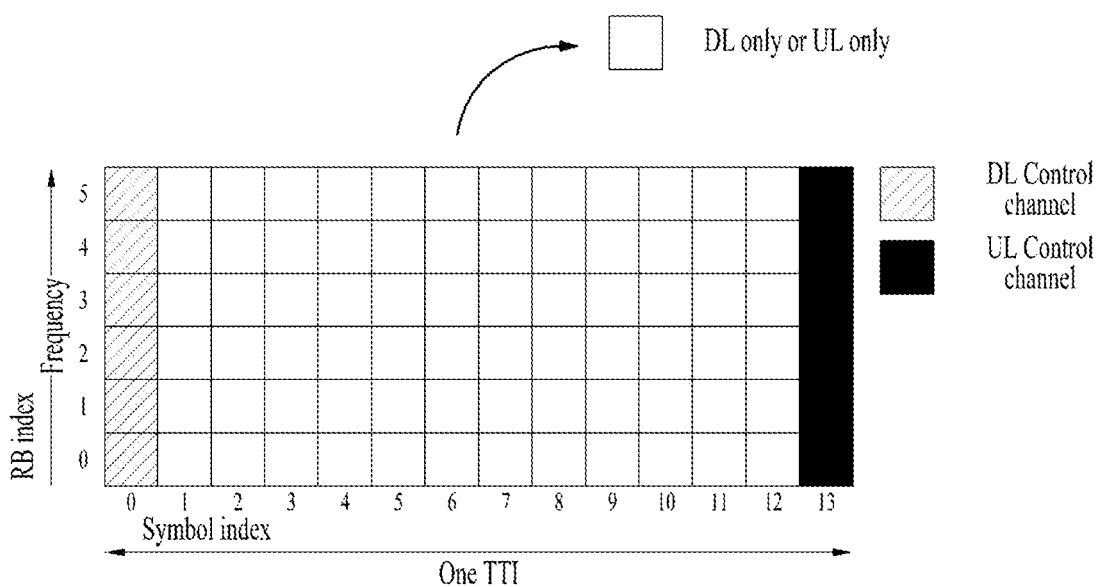
FIG. 2 is a diagram illustrating the structure of a subframe where Time Division Multiplexing (TDM) is applied to data and control channels.

FIG. 2 is a diagram illustrating the structure of a subframe where Time Division Multiplexing (TDM) is applied to data and control channels.

Specifically, FIG. 2 shows that the TDM is applied to data and control channels in one subframe. In FIG. 2, the hatched area represents a Downlink (DL) control region (i.e., a resource region in which a DL control channel is transmitted), and the black area represents an Uplink (UL) control region (i.e., a resource region in which a UL control channel is transmitted). The empty area in the subframe of FIG. 2 can be used for DL or UL data transmission. In this structure, since DL transmission and UL transmission are sequentially performed in a single subframe, it is possible to transmit DL data and receive UL ACK/NACK in the single subframe. Therefore, in case a data transmission error occurs, time taken until data retransmission is reduced, thereby minimizing the latency of the overall data transmission.

In the above subframe structure where the data and control channels are Time Division Multiplexed (TDMed), a time gap is required to allow a BS and a UE to switch from transmission mode to reception mode and vice versa. To this end, in this subframe structure, some Orthogonal Frequency Division Multiplexing (OFDM) symbols at the time of switching from DL to UL are set as a guard period (GP).

More specifically, in FIG. 2, the hatched area represents a transmission region for transmitting a Physical Downlink Control Channel (PDCCH) carrying Downlink Control Information (DCI), and the last symbol is a transmission region for transmitting a Physical Uplink Control Channel (PUCCH) carrying Uplink Control Information (UCI). Here, the DCI corresponding to control information transmitted from a BS to a UE may include information on a cell configuration the UE should know, DL-specific information such as DL scheduling, UL-specific information such as a UL grant, etc. The UCI corresponding to control information transmitted from a UE to a BS may include an HARQ ACK/NACK report on DL data, a CSI report on a DL channel state, a Scheduling Request (SR), etc.

In FIG. 2, the empty area may be used for a data channel for DL data transmission (e.g., Physical Downlink Shared Channel (PDSCH)) or a data channel for UL data transmission (e.g., Physical Uplink Shared Channel (PUSCH)). According to this structure, DL transmission and UL transmission are sequentially performed in a single subframe. Thus, in the single subframe, a BS can transmits DL data and receive an HARQ ACK/NACK signal from a UE in response to the DL data. Consequently, it is possible to reduce a time taken until data retransmission, thereby minimizing the latency of the overall data transmission.

In such a self-contained subframe structure, a time gap is required to allow a BS and a UE to switch from transmission mode to reception mode and vice versa. To this end, in this subframe structure, some Orthogonal Frequency Division Multiplexing (OFDM) symbols at the time of switching from DL to UL are set as a guard period (GP).

The new RAT system considers at least the following four subframe types as examples of configurable self-contained subframe types. In the four subframe types, individual sections are arranged within a subframe in time order.

1) DL control region+DL data region+GP+UL control region

2) DL control region+DL data region

3) DL control region+GP+UL data region+UL control region

4) DL control region+GP+UL data region

Among new RAT system requirements, the most important one may be an environment where multiple services which requires transmission of different control information, i.e., different measurement requirements coexist at the same time.

In the new RAT system, since not only various numerology/services coexist but various UL channel structures are present, it is expected that UL channels are generated in accordance with a configuration such as UL beam sweeping, which was not present in the prior art, and many variations occur in measurement. Thus, Inter-Cell Interference (ICI) could also significantly vary. That is, since it is difficult to obtain and determine information on the significantly varying ICI using conventional measurement and reporting methods, an interference measurement and reporting method suitable for the new RAT system needs to be developed. Hence, the present disclosure proposes a method of allocating measurement resources to mitigate UL ICI in the new RAT system.

Figure 3:
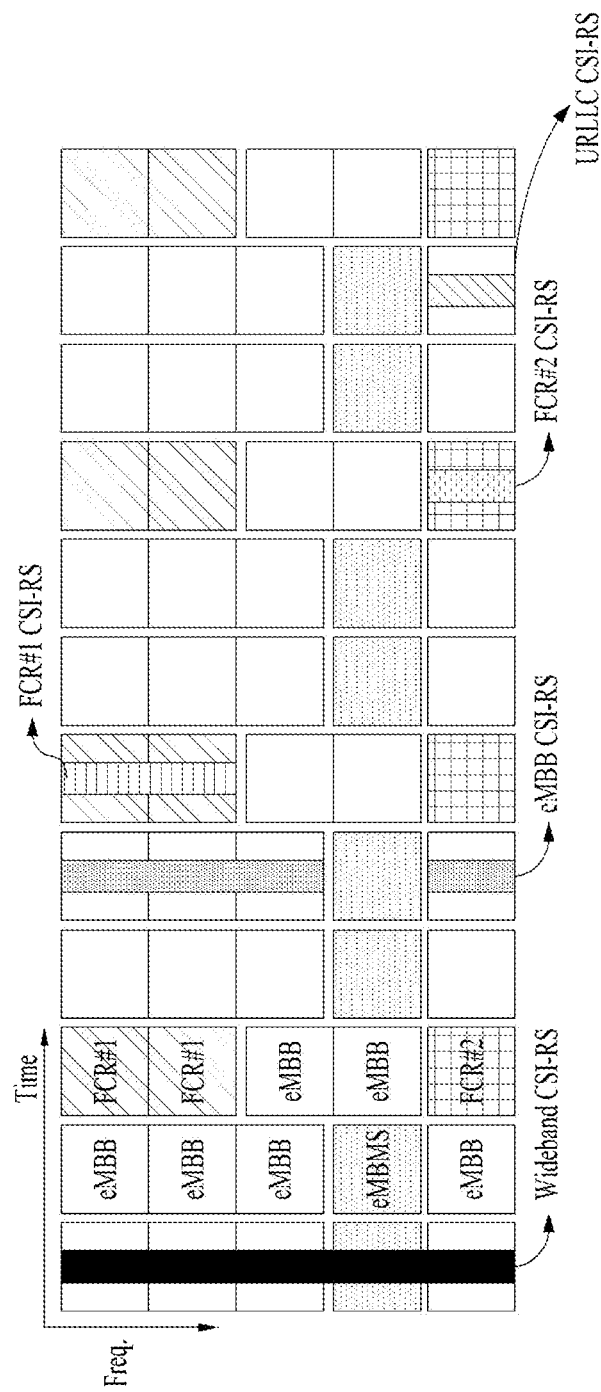
FIG. 3 is a diagram illustrating a hybrid (wideband and sub-band) CSI-RS structure for supporting various services in the new RAT system.

FIG. 3 illustrates a hybrid (wideband and sub-band) CSI-RS structure for supporting various services in the new RAT system.

To simultaneously support various services in the new RAT system, different CSI-RSs need to be formed in wideband and sub-band structures in terms of DL transmission as shown in FIG. 3. If the structure of FIG. 3 is regarded as one of the new RAT system requirements, UL resources may be formed in a similar manner.

Figure 4:
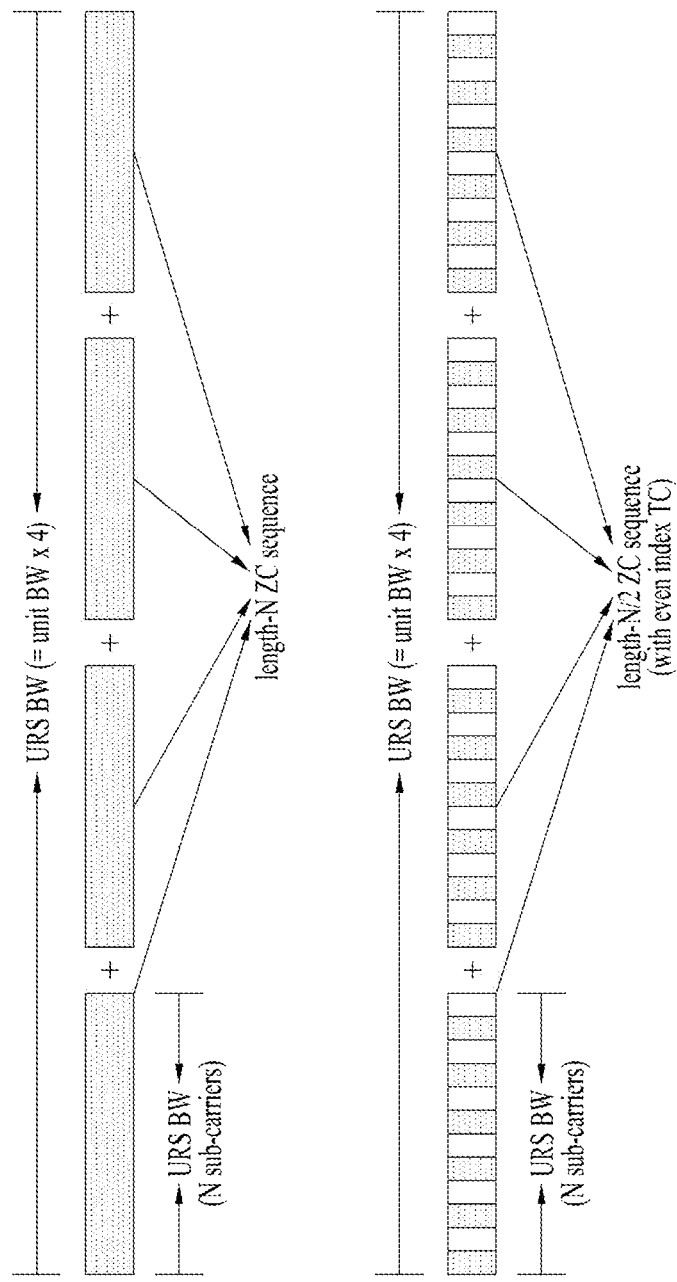
FIG. 4 is a diagram illustrating the definition of a localized Uplink RS (URS) unit Bandwidth (BW) and the deployment thereof (including transmission combs).

FIG. 4 illustrates the definition of a localized Uplink RS (URS) unit Bandwidth (BW) and the deployment thereof (including transmission combs).

In a UL SRS structure (an SRS can be referred to as an xSRS in the new RAT system), a UE may perform not only transmission in the whole band but also localized or distributed transmission for each symbol depending on service requirements. To efficiently allocate resources in the above structure, an SRS can be multiplexed with another UL channel (e.g., UL control channel).

It can be seen from FIG. 4 that the whole BW is divided into four localized SRS unit BWs. In particular, if a Zadoff-chu (ZC) root index value or a Pseudo Random (PR) scrambling seed value is used to generate a localized SRS sequence, it may be determined based on at least one of a physical cell ID, virtual cell ID, UE-dedicated ID (e.g., C-RNTI), UE-common ID (e.g., UE-common RNTI), beam ID (or index), subframe index, symbol index, and AP index (for example, as a function thereof).

Structure According to UE Capability in New RAT

It is expected that the new RAT system requires a BS and a UE to satisfy the following requirements unlike the LTE system.

UE TRP increase: An increase in SRS dimensioning (for example, a port, a Cyclic Shift (CS), an Orthogonal Cover Code (OCC), a transmission comb, etc.) is required.

Advanced transceiver: An advanced transceiver structure is required to improve interference measurement reporting (network-assisted interference control).

UL beam tracking: A UL beam tracking structure is required when beam tracking needs to be performed not only for DL channels but also for UL channels (multi-symbol-wise SRS transmission).

Channel reciprocity: For both cases where reciprocity between DL and UL channels is established or not, structures are required (a UL sounding RS needs to be supported for DL channel estimation).

For such various UE capability requirements, a dynamic and flexible SRS configuration is required, and for efficient control, a structure capable of supporting the configuration in a single UL framework should be established.

Figure 5:
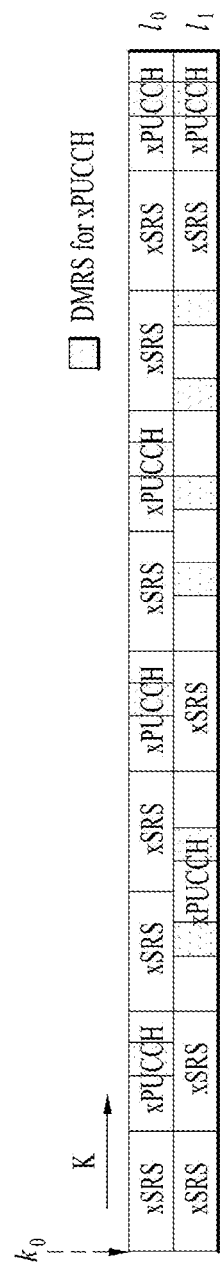
FIG. 5 is a diagram illustrating a DMRS required for channel multiplexing between an SRS and a PUCCH.

FIG. 5 illustrates a DMRS required for channel multiplexing between an SRS and a PUCCH.

When localized SRS resources and uplink control channel (e.g., PUCCH) resources coexist and they are distributed over the entire BW (frequency multiplexing), a DMRS for uplink control is required to decode a PUCCH as shown in FIG. 5. In FIGS. 5, $1_0$ and $1_1$ indicates symbol indices, respectively, and $k_o$ indicates a subcarrier index.

In the structure shown in FIG. 5, the length of a localized SRS can be equivalent to that of a Resource Element (RE), a Resource Block (RB), or an SRS unit. Since the localized SRS is multiplexed with a PUCCH, a BS can estimate a UL data channel (e.g., PUSCH) in a sub-band-wise manner. DMRSs may be located at a suitable interval within the PUCCH by considering a coherent BW. For example, two REs may be consecutively located at intervals of four REs, and thus ¼ REs may be present per RB. Such a frequency-domain multiplexing structure between a localized SRS and a PUCCH may be changed variously depending on the characteristics of a UL channel or the characteristics of a UL beam pair between a UE and a BS.

FIG. 6 illustrates utilization of UL channel estimation in a self-contained subframe structure when SRS+xPUCCH symbols are triggered.

When channel estimation needs to be performed on sub-bands uniformly distributed over the entire BW, even a structure where localized SRSs with short lengths are densely multiplexed with PUCCHs can be modified suitably. In general, the length of a PUCCH is fixed by fixed Uplink Control Information (UCI) formats. Based on this structure, channel estimation can be performed in a certain sub-band region using a DMRS for a UL data channel in a corresponding part of an xPUCCH (a PUCCH can be referred to as an xPUCCH in the new RAT system). However, if multiplexing between SRSs and xPUCCHs is enabled, the multiplexing between the SRSs and xPUCCHs needs to be further utilized for more efficient UL data detection. To estimate a UL data channel, it is desirable to create a region where an xSRS and a DMRS for the data channel can be maximally used as shown in FIG. 6.

Proposal 1:

If a localized SRS is configured to have a suitable length compared to a UL frequency coherence length i.e., $K_{localized\_SRS}^{(p)} \approx B_{coherent}$ (for example, if the frequency band length of the localized SRS is set smaller than the length of a coherent BW), it is possible to establish a structure where the localized SRS is multiplexed with an xPUCCH in the frequency domain by segmenting the xPUCCH by the length of the localized SRS.

Figure 7:
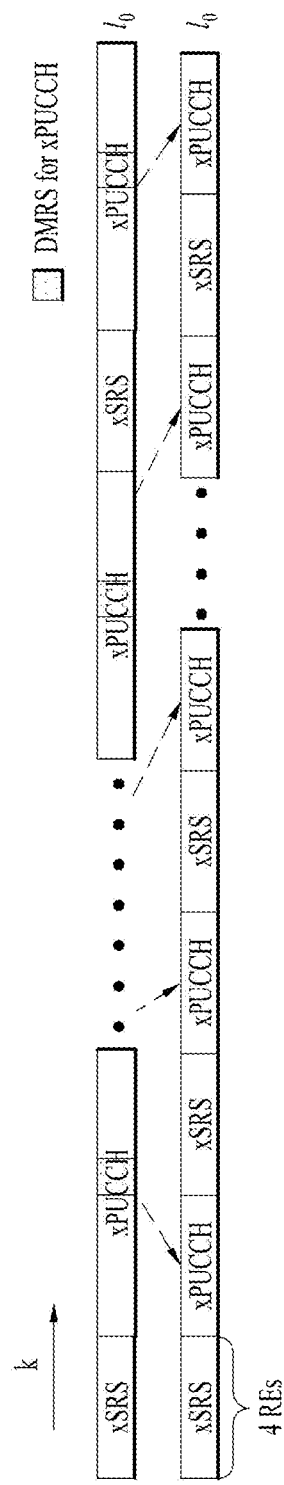
FIG. 7 is a diagram illustrating segmentation of an xPUCCH format (6 RBs->18×4 REs).

FIG. 7 illustrates segmentation of an xPUCCH format (6 RBs->18×4 REs).

It is assumed that the length of the xPUCCH format is 6 RBs, the length of an xSRS unit is 4 REs, and a coherent BW is composed of 4 REs. If a 'localized SRS+xPUCCH' channel configuration is enabled by a serving cell (or a serving BS) and the xPUCCH is segmented by the xSRS unit as shown in FIG. 7, 12*6/4=18 xPUCCH sub-blocks can be generated. Thereafter, the serving BS may alternately allocate the xPUCCH and the xSRS unit to frequency-domain resources as shown in FIG. 7.

The most significant benefit of this structure is that the density of xPUCCH resources in symbols where the xSRS and xPUCCH are multiplexed is fixed, a UL channel estimation region increases, and an xSRS can be used as a DMRS for the xPUCCH.

Proposal 1-1: As a sub-proposal of Proposal 1, it is proposed that a UE transmits an xSRS as a DMRS for a segmented xPUCCH (or for the same use as the DMRS). In this case, the UE transmits an xSRS unit (or localized SRS) on a port corresponding to a corresponding xPUCCH port. That is, the xSRS unit may be used not only as a DMRS for demodulating an adjacent xPUCCH resource but also for UL channel estimation in a related sub-band region by a BS.

Figure 8:
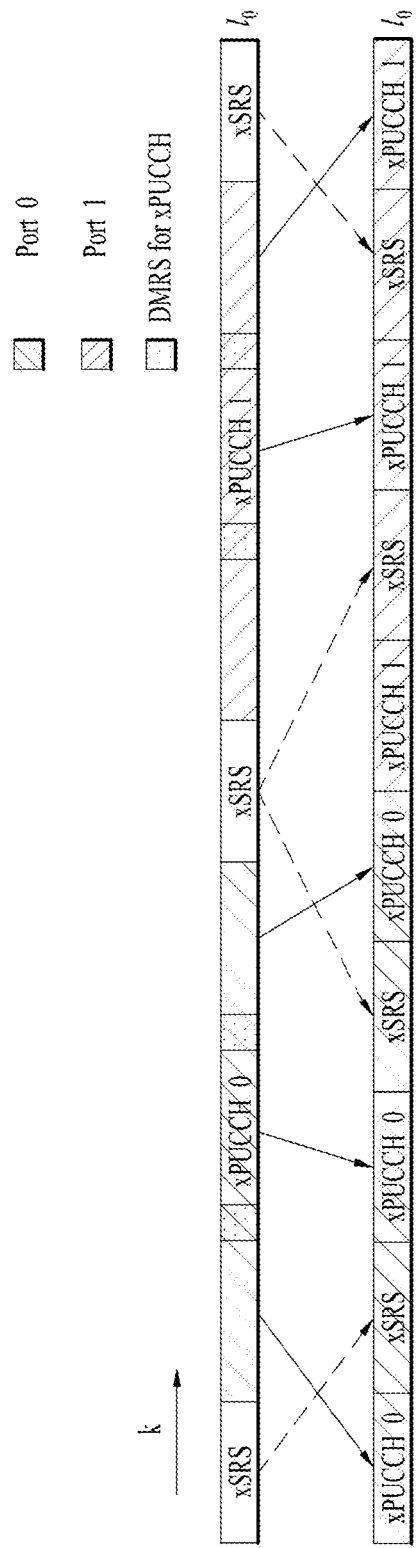
FIG. 8 is a diagram illustrating xPUCCH segmentation and xSRS port mapping.

FIG. 8 illustrates xPUCCH segmentation and xSRS port mapping.

For example, assuming that when a different port is used for a symbol where an xSRS and an xPUCCH are multiplexed (for example, when ports 0 and 1 are used for xPUCCHs 0 and 1, respectively), the xPUCCH is segmented into three xPUCCH sub-blocks with respect to an xSRS unit, SRS ports positioned at locations obtained by segmenting xPUCCH 0 may be set to xPUCCH port 0, and SRS ports positioned at locations obtained by segmenting xPUCCH 1 may be set to xPUCCH port 1. By doing so, for each xPUCCH, xSRS units with the same port may be transmitted as a DMRS. In addition, such xSRSs may be used to estimate UL channels for allocated sub-bands.

Proposal 1-2: As another sub-proposal of Proposal 1, it is proposed that the structure according to Proposal 1-2 is applied to some xPUCCHs. In this case, whether the structure is applied or not may be determined depending on the number of xPUCCHs, the quality of a sub-band based on UL channel estimation, or a different service state per sub-band.

Figure 9:
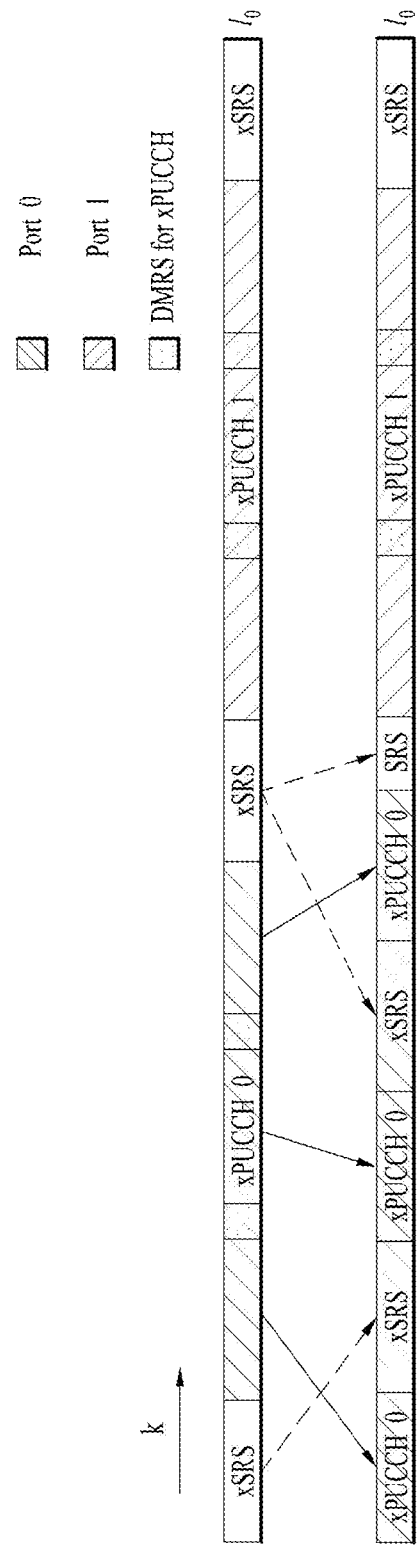
FIG. 9 is a diagram illustrating partial xPUCCH segmentation and xSRS port mapping.

FIG. 9 illustrates partial xPUCCH segmentation and xSRS port mapping.

For example, in FIG. 9, xPUCCH 0 may be a UL control channel for eMBB services, and xPUCCH 1 may be a UL control channel for URLLC services. For the eMBB services, xPUCCH 0 may be segmented into a plurality of xPUCCH sub-blocks and then transmitted.

Specifically, a structure where only xPUCCH 0 is segmented into the plurality of xPUCCH sub-blocks and xPUCCH 1 is transmitted together with a DMRS for xPUCCH 1 can be configured as shown in FIG. 9. In this case, a UE may transmit the frequency division multiplexed xPUCCH 0 sub-blocks and transmit xPUCCH 1 in a corresponding band without any segmentation.

Proposal 2:

If the proposed resource structure is partially enabled as mentioned in Proposal 1-2, there may be a region where a DMRS in an xPUCCH region is replaced with an xSRS and the length of the xSRS is changed. In this case, a BS can adjust an internal transmission comb structure for the changed xSRS unit or the number of UEs allocated within the xSRS unit.

Figure 10:
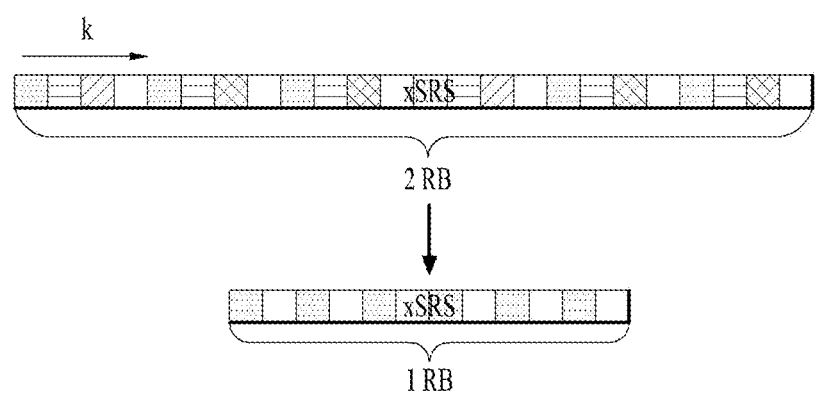
FIG. 10 is a diagram illustrating a method of allocating changed xSRS resources.

FIG. 10 illustrates a method of allocating changed xSRS resources.

In FIG. 10, it is assumed that an xSRS unit has a comb set to 4 (i.e., comb=4) and a length of 2 RBs. In addition, it is assumed that four UEs are allocated resources. If the length of the xSRS unit is changed to 1 RB (12 REs), a BS changes the comb to 2 (i.e., comb=2) and allocates resources for two UEs. In this case, a sequence length per UE is maintained although the length of the xSRS unit decreases. Thus, sequence generation can be performed using the same xSRS sequence generation method.

Proposal 3:

In the structures of Proposals 1 and 2, when xSRS+xPUCCH symbols (i.e., symbols where an xSRS and an xPUCCH are multiplexed) are enabled, a BS may schedule for a UE the xSRS+xPUCCH symbols according to Proposals 1 and 2 persistently, semi-persistently, or in an on-demand manner.

Proposal 4:

A BS can independently configure localized-xSRS triggering and xPUCCH triggering. In this case, since a localized xSRS and an xPUCCH may overlap with each other on the same resource, a resource allocation method may be required from the perspective of a UE. Specifically, if the conditions of Proposal 1 are satisfied, a UE changes the xSRS/xPUCCH multiplexing resource structure to the following structure and then transmits feedback to inform the change. Hereinafter, each case and resource allocation method therefor will be described.

When aperiodic DL CSI feedback or a PUCCH for ACK/NACK is triggered and when it is indicated that a localized SRS is transmitted on allocated resources, a BS and a UE may operate according to the following three steps.

1. The BS informs the UE of a transmission location of CSI feedback via DCI.

2. The UE checks the CSI feedback location and an SRS location, which are received from the BS. If the conditions of Proposal 1 are satisfied, the UE segments an xPUCCH to be transmitted and transmits the requested CSI feedback information using xPUCCH sub-blocks. In this case, the UE may insert a localized xSRS between xPUCCH sub-blocks. The BS may determine a multiplexing pattern in advance and then inform the UE of the multiplexing pattern through RRC signaling. The UE may feedback resource locations of the individual xPUCCH sub-blocks to the BS. Upon receiving the resource locations of the individual xPUCCH sub-blocks from the UE, the BS can grasp resource locations of xSRSs.

3. Based on the feedback information including the resource locations of the individual xPUCCH sub-blocks transmitted from the UE, the BS may perform decoding on the resources of the xPUCCH sub-blocks and localized xSRSs. Specifically, the BS may obtain the feedback information from the xPUCCH sub-blocks and perform UL channel estimation using the localized xSRSs.

When UL localized-xSRS transmission is triggered and when it is indicated that an xPUCCH for periodic DL CSI feedback is transmitted on allocated resources, a BS and a UE may operate according to the following three steps.

1. The BS may trigger the UL localized-xSRS transmission.

2. The UE checks the locations of periodic CSI feedback and localized xSRSs. If the conditions of Proposed 1 are satisfied, the UE segments an xPUCCH to be transmitted and transmits the periodic CSI feedback using xPUCCH sub-blocks. In this case, the UE may insert a localized xSRS between xPUCCH sub-blocks. The BS may determine a multiplexing pattern in advance and then inform the UE of the multiplexing pattern through RRC signaling. The UE may feedback resource locations of the individual xPUCCH sub-blocks to the BS. Upon receiving the resource locations of the individual xPUCCH sub-blocks from the UE, the BS can grasp resource locations of xSRSs.

3. Based on the feedback information including the resource locations of the individual xPUCCH sub-blocks transmitted from the UE, the BS may perform decoding on the resources of the xPUCCH sub-blocks and localized xSRSs. Specifically, the BS may obtain the feedback information from the xPUCCH sub-blocks and perform UL channel estimation using the localized xSRSs.

As described above, if the condition that the length of a localized SRS unit is similar to or smaller than a coherent BW is satisfied in symbols where localized SRSs and xPUCCHs are frequency division multiplexed in the frequency domain and distributed over the entire bandwidth, a UE may segment an xPUCCH into multiple xPUCCH sub-blocks and place a localized SRS between xPUCCH sub-blocks. Thereafter, the UE may transmit xSRSs that can act as DMRSs for the individual xPUCCH sub-blocks and, at the same time, be used to estimate UL data channels, using the same port as that of the xPUCCH. The structure where the xPUCCH sub-blocks and xSRSs are multiplexed has advantages in that the density of xPUCCH resources is maintained at the same level and the density of xSRS resources increases.

In the new RAT system, a UL SRS structure is highly likely to be configured not only on whole-band resources but also on sub-band-wise distributed resources, and it is expected that an aperiodic network triggering approach method will be mainly used as a scheduling method.

According to an embodiment of the present disclosure, when sub-band SRS resources are triggered and when a UL control channel and a sub-band SRS are multiplexed, it is possible to use the subband SRS as a DMRS of the UL control channel based on various multiplexing structures between the subband SRS and UL control channel.

The above-described embodiments correspond to combinations of elements and features of the present invention in prescribed forms. And, the respective elements or features may be considered as selective unless they are explicitly mentioned. Each of the elements or features can be implemented in a form failing to be combined with other elements or features. Moreover, it is able to implement an embodiment of the present invention by combining elements and/or features together in part. A sequence of operations explained for each embodiment of the present invention can be modified. Some configurations or features of one embodiment can be included in another embodiment or can be substituted for corresponding configurations or features of another embodiment. And, it is apparently understandable that an embodiment is configured by combining claims failing to have relation of explicit citation in the appended claims together or can be included as new claims by amendment after filing an application.

Those skilled in the art will appreciate that the present invention may be carried out in other specific ways than those set forth herein without departing from the spirit and essential characteristics of the present invention. The above embodiments are therefore to be construed in all aspects as illustrative and not restrictive. The scope of the invention should be determined by the appended claims and their legal equivalents, not by the above description, and all changes coming within the meaning and equivalency range of the appended claims are intended to be embraced therein.

INDUSTRIAL APPLICABILITY

The methods of transmitting and receiving a UL control channel and a localized SRS that are multiplexed and devices therefor can be industrially applied to various wireless communication systems including the 3GPP LTE/LTE-A system, the new RAT communication system, and the like.

What is claimed is:

1. A method performed by a user equipment (UE) operating in a wireless communication system, the method comprising:
   multiplexing sounding reference signals (SRSs) and uplink control channel sub-blocks segmented from an uplink control channel in a frequency domain; and
   transmitting a symbol including the SRSs and the uplink control channel sub-blocks that are multiplexed,
   wherein the uplink control channel includes uplink control information, and
   wherein the multiplexed uplink control channel sub-blocks are transmitted without demodulation reference signals.

2. The method of claim 1, wherein the uplink control channel sub-blocks and the SRSs are transmitted on a same antenna port.

3. The method of claim 1, wherein at least one of the SRSs is transmitted at a resource between the segmented uplink control channel sub-blocks.

4. The method of claim 1, wherein the uplink control channel is segmented into the uplink control channel sub-blocks and transmitted, based on the uplink control channel being used for a specific service.

5. The method of claim 1, wherein a region except a resource region related to a reference signal included in the uplink control channel is segmented into the uplink control channel sub-blocks.

6. A method performed by a base station (BS) operating in a wireless communication system, the method comprising:
   receiving a symbol including sounding reference signals (SRSs) and uplink control channel sub-blocks that are multiplexed in a frequency domain,
   wherein the uplink control channel sub-blocks are segmented from an uplink control channel,
   wherein the uplink control channel includes uplink control information, and
   wherein the multiplexed uplink control channel sub-blocks are received without demodulation reference signals.

7. The method of claim 6, wherein at least one of the SRSs is received at a resource between the segmented uplink control channel sub-blocks.

8. The method of claim 6, further comprising:
   estimating an uplink channel based on the SRSs.

9. The method of claim 6, wherein a region except a resource region related to a reference signal included in the uplink control channel is segmented into the uplink control channel sub-blocks.

10. A user equipment (UE) configured to operate in a wireless communication system, the UE comprising:
    a transceiver; and
    a processor coupled to the transceiver, wherein the processor is configured to:
    multiplex sounding reference signals (SRSs) and uplink control channel sub-blocks segmented from an uplink control channel in a frequency domain; and
    transmit a symbol including the SRSs and the uplink control channel sub-blocks that are multiplexed,
    wherein the uplink control channel includes uplink control information, and
    wherein the multiplexed uplink control channel sub-blocks are transmitted without demodulation reference signals.

11. The UE of claim 10, wherein the processor is further configured to transmit the segmented uplink control channel sub-blocks and the SRSs on a same antenna port.

12. The UE of claim 10, wherein the processor is further configured to transmit at least one of the SRSs at a resource between the segmented uplink control channel sub-blocks.

13. The UE of claim 10, wherein the processor is further configured to transmit the segmented uplink control channel sub-blocks in a region of the uplink control channel except a resource region related to a reference signal included in the uplink control channel.

14. A base station (BS) configured to operate in a wireless communication system, the base station comprising:
   a transceiver; and
   a processor coupled to the transceiver,
   wherein the processor is configured to:
      receive a symbol including sounding reference signals (SRSs) and uplink control channel sub-blocks that are multiplexed in a frequency domain,
      wherein the uplink control channel sub-blocks are segmented from an uplink control channel,
      wherein the uplink control channel includes uplink control information, and
      wherein the multiplexed uplink control channel sub-blocks are received without demodulation reference signals.

15. The base station of claim 14, wherein the processor is configured to estimate an uplink channel based on the SRSs.

16. The method of claim 1, wherein the SRSs include a first SRS and a second SRS, and
   wherein a frequency bandwidth of the first SRS is equal to or smaller than a length of a coherent bandwidth.

17. The method of claim 1, wherein the SRSs include a first SRS and a second SRS, and
   wherein at least one of the uplink control channel sub-blocks is located between the first SRS and the second SRS.

* * * * *